(12) United States Patent
Oh (10) Patent No.: US 7,907,227 B2
(45) Date of Patent: Mar. 15, 2011

(54) LIQUID CRYSTAL DISPLAY

(75) Inventor: Joon-Hak Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1003 days.

(21) Appl. No.: 11/707,786

(22) Filed: Feb. 15, 2007

(65) Prior Publication Data

US 2007/0195213 A1  Aug. 23, 2007

(30) Foreign Application Priority Data

Feb. 17, 2006  (KR) ........................ 10-2006-0015478

(51) Int. Cl.
*G02F 1/136* (2006.01)
*G02F 1/1333* (2006.01)

(52) U.S. Cl. .......................................... 349/44; 349/111

(58) Field of Classification Search .................... 349/38, 349/44, 106, 110, 111
See application file for complete search history.

(56) References Cited

U.S. PATENT DOCUMENTS

| | | | | |
|---|---|---|---|---|
| 4,759,610 | A | * | 7/1988 | Yanagisawa .................. 349/162 |
| 6,219,118 | B1 | | 4/2001 | Zhang |
| 6,317,173 | B1 | * | 11/2001 | Jung et al. ........................ 349/42 |
| 6,771,342 | B1 | * | 8/2004 | Hirakata et al. .............. 349/141 |
| 2003/0020851 | A1 | * | 1/2003 | Kim et al. ..................... 349/106 |
| 2006/0097978 | A1 | * | 5/2006 | Ng et al. ........................ 345/102 |

FOREIGN PATENT DOCUMENTS

| | | |
|---|---|---|
| JP | 11-316391 | 11/1999 |
| JP | 11-316392 | 11/1999 |
| JP | 2000-315734 | 11/2000 |
| JP | 2002-182244 | 6/2002 |
| JP | 2003-084687 | 3/2003 |
| KR | 1994-009735 | 5/1994 |
| KR | 0154810 | 7/1998 |
| KR | 100223879 | 7/1999 |
| KR | 0386203 | 5/2003 |
| KR | 0442898 | 7/2004 |

OTHER PUBLICATIONS

English Language Abstract, KR Patent First Publication No. 0442898, Jul. 23, 2004, 1 page.
English Language Abstract, KR Patent First Publication No. 0386203, May 21, 2003, 1 page.
English Language Abstract, JP Patent First Publication No. 2003-084687, Mar. 19, 2003, 1 page.
English Language Abstract, JP Patent First Publication No. 2002-182244, Jun. 26, 2002, 1 page.
English Language Abstract, JP Patent First Publication No. 2000-315734, Nov. 14, 2000, 1 page. English Language Abstract, JP Patent First Publication No. 11-316392, Nov. 16, 1999, 1 page.
English Language Abstract, JP Patent First Publication No. 11-316391, Nov. 16, 1999, 1 page.
English Language Abstract, KR Patent First Publication No. 10223879, Jul. 12, 1999, 1 page.
English Language Abstract, KR Patent First Publication No. 0154810, Jul. 10, 1998, 1 page.
English Language Abstract, KR Patent First Publication No. 1994-009735, May 24, 1994, 1 page.

* cited by examiner

*Primary Examiner* — David Nelms
*Assistant Examiner* — David Y Chung
(74) *Attorney, Agent, or Firm* — Innovation Councel LLP (57) ABSTRACT

A liquid crystal display is provided with a first substrate, a color filter formed on the first substrate, a first electrode formed on the color filter, an interlayer insulating layer formed on the first electrode, a light blocking member formed on the interlayer insulating layer and partially overlapping the first electrode, a second substrate facing the first substrate, a second electrode formed on the second substrate, and a liquid crystal layer interposed between the first and second substrates, wherein the light blocking member and the first electrode may be overlap each other, with the interlayer insulating layer interposed therebetween to form a storage capacitor.

4 Claims, 9 Drawing Sheets

LIQUID CRYSTAL DISPLAY

CROSS-REFERENCE TO RELATED APPLICATION

This application claims priority to and the benefit of Korean Patent Application No. 10-2006-0015478 filed in the Korean Intellectual Property Office on Feb. 17, 2006, the entire contents of which are incorporated herein by reference.

BACKGROUND OF THE INVENTION

1. Field of the Invention

The present invention relates to a liquid crystal display.

2. Description of the Related Art

A liquid crystal display (LCD) includes a pair of display panels having field generating electrodes and polarizers and a liquid crystal layer interposed between the two display panels. Field generating electrodes generate an electric field of varying intensity thereby varying the arrangement of liquid crystal molecules and changing the polarization of light passing through the liquid crystal layer. A polarizer blocks or transmits the polarized light appropriately to make bright and dark regions, thereby displaying desired images.

Color filters corresponding to respective pixels are formed on one display panel of a liquid crystal display and light blocking members are formed around the boundaries of the respective pixels. The color filters represent three primary colors, red, green, and blue, and the light blocking members block light that passes through portions of the liquid crystal layer that are not controlled by pixel electrodes to improve the contrast ratio of the liquid crystal display.

Generally, a liquid crystal display is completed by forming color filters and light blocking members on one panel opposite to the other panel on which the pixel electrodes are formed, assembling the two completed display panels to face each other, and injecting liquid crystal between the two display panels.

When a gate-on voltage is applied to a thin film transistor of a liquid crystal display, the liquid crystal layer, which is an electro-optic active layer, is charged and the charge is maintained until the next time that a gate-on voltage is applied. When the gate-on voltage is changed to a gate-off voltage, the pixel voltage drops down slightly. A storage capacitor reduces the range of the fluctuation to maintain the pixel voltage constantly.

Therefore, it is desirable that the capacitance of a storage capacitor in a liquid crystal display be as large as possible.

However, as a storage electrode is formed to increase the capacitance of a storage capacitor in the liquid crystal display, the aperture ratio of the liquid crystal display is decreased.

Also, misalignment between the pixel electrodes and the color filters and light blocking members may occur in the process of assembling the two display panels of the liquid crystal display to face each other, and the misalignment may decrease color reproducibility and contrast ratio.

Therefore, it would be desirable to provide a liquid crystal display that can maintain a high contrast ratio of the liquid crystal display and raise the aperture ratio of the liquid crystal display while increasing the capacitance of storage capacitors.

SUMMARY OF THE INVENTION

According to one aspect of the present invention, alignment error between the display panels is reduced and the aperture ratio of the liquid crystal display is increased in a liquid crystal display that includes a first substrate, a color filter formed on the first substrate, a first electrode formed on the color filter, an interlayer insulating layer formed on the first electrode, a light blocking member formed on the interlayer insulating layer and partially overlapped by the first electrode, a second substrate facing the first substrate, a second electrode formed on the second substrate, and a liquid crystal layer interposed between the first and second substrates. The light blocking member and the first electrode may be overlap each other with the interlayer insulating layer interposed therebetween to form a storage capacitor.

The liquid crystal display may further include a gate line formed on the first substrate having a gate electrode, a gate insulating layer formed on the first substrate, a semiconductor layer formed on the gate insulating layer, a data line and a drain electrode formed on the gate insulating layer and the semiconductor layer, and a passivation layer formed on the data line and the drain electrode.

A storage voltage may be applied to the light blocking member.

Another exemplary embodiment of the present invention provides a liquid crystal display including a first substrate, a first electrode formed on the first substrate, an interlayer insulating layer formed on the first electrode, a light blocking member formed on the interlayer insulating layer and partially overlapped with the first electrode, a second substrate facing the first substrate, a second electrode formed on the second substrate, a liquid crystal layer interposed between the first and second substrates, and a light source unit for providing the first and second substrates and the liquid crystal layer with light. The light source unit may include a plurality of light sources for representing respective primary colors, and the plurality of light sources may be sequentially switched off to represent a desired color with the temporal sum of the primary colors.

The light blocking member and the first electrode may be overlapped with each other with the interlayer insulating layer interposed therebetween to form a storage capacitor.

A storage voltage may be applied to the light blocking member.

The liquid crystal display may further include a gate line formed on the first substrate and including a gate electrode, a gate insulating layer formed on the first substrate, a semiconductor layer formed on the gate insulating layer, a data line and a drain electrode formed on the gate insulating layer and the semiconductor layer, and a passivation layer formed on the data line and the drain electrode

DETAILED DESCRIPTION OF THE EMBODIMENTS

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an exemplary embodiment of the present invention will now be described in detail with reference to FIG. 1 to FIG. 3.

Figure 1:
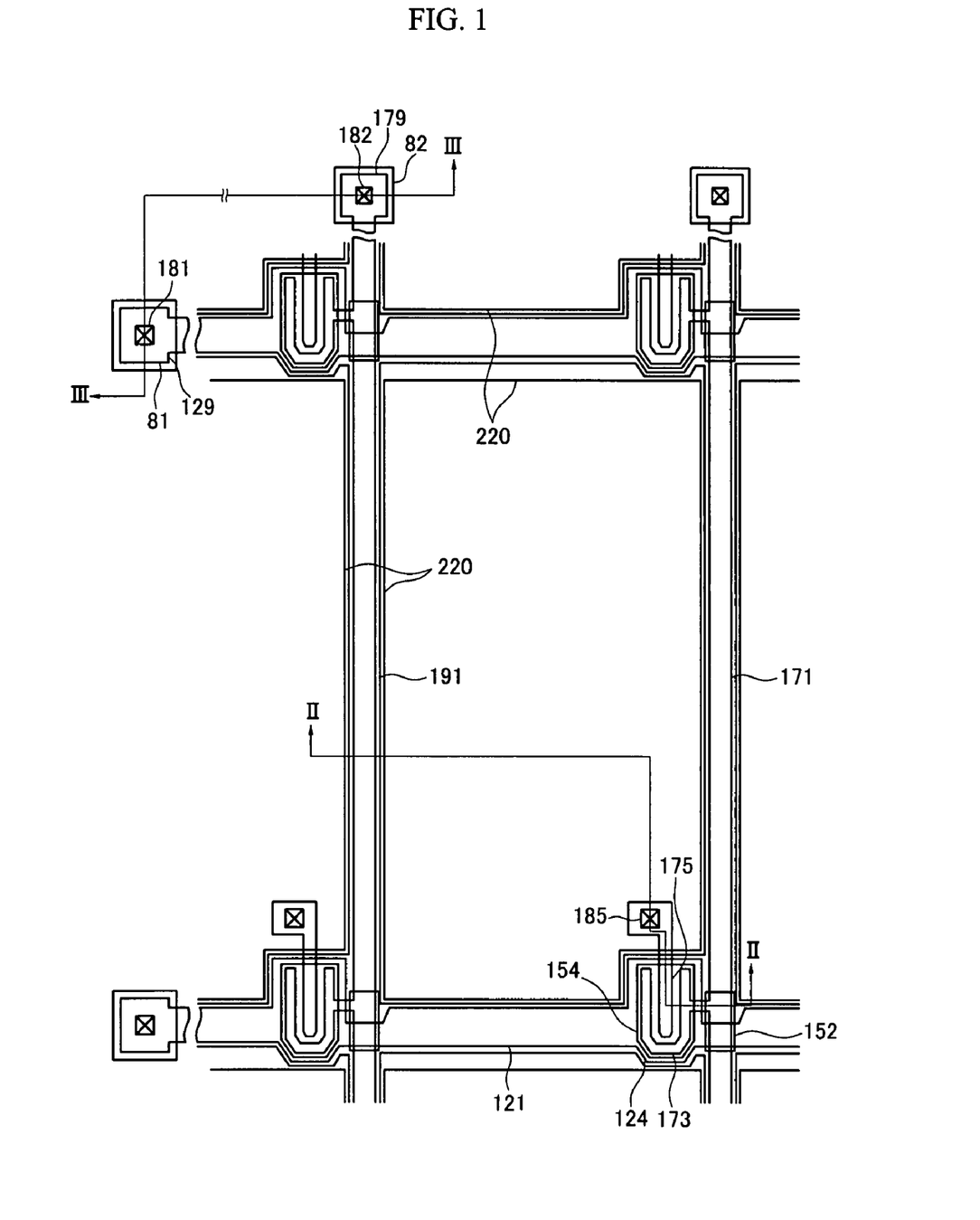
FIG. 1 is a layout view of a liquid crystal display according to an exemplary embodiment of the present invention.
Figure 2:
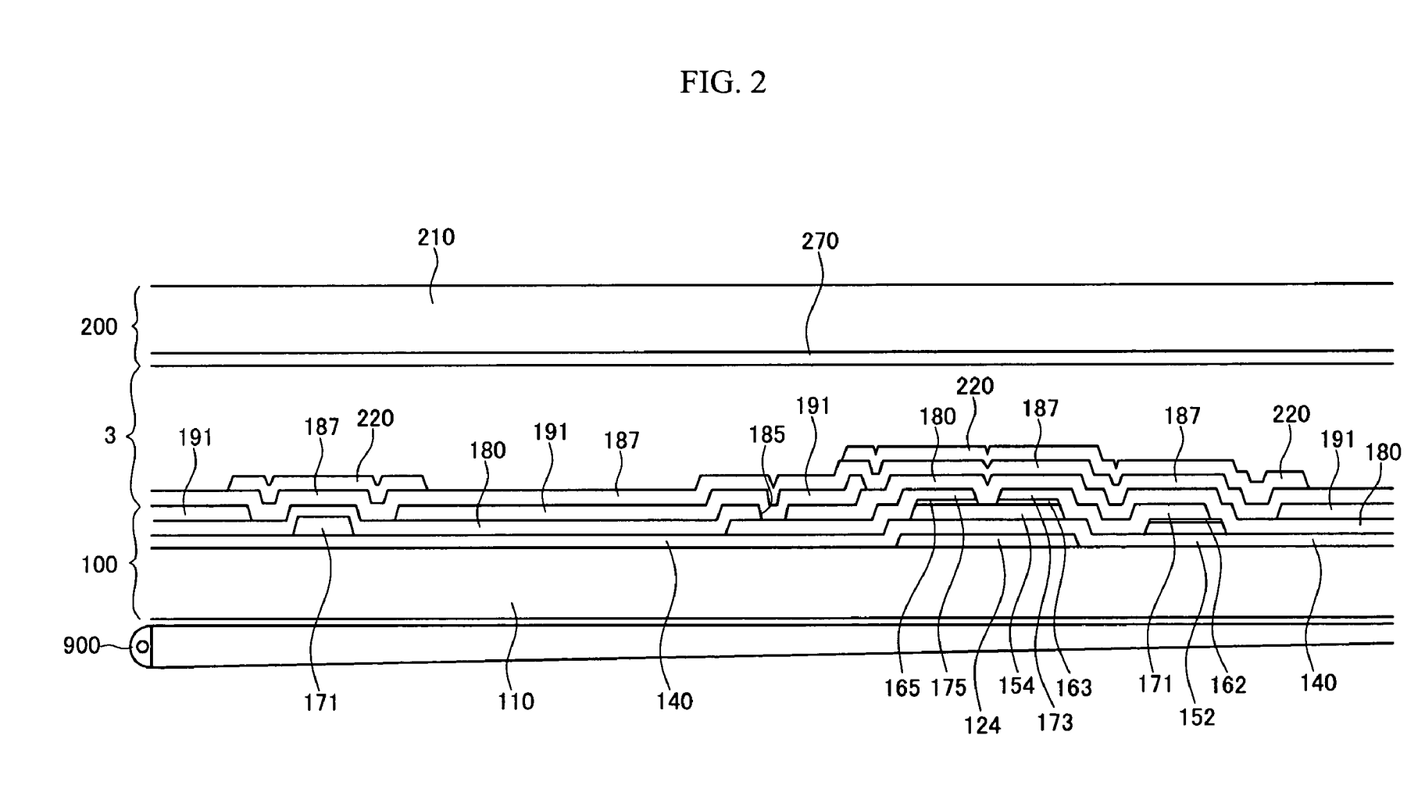
FIG. 2 and FIG. 3 are cross-sectional views of the liquid crystal display taken along lines II-II and III-III of FIG. 1, respectively.
Figure 3:
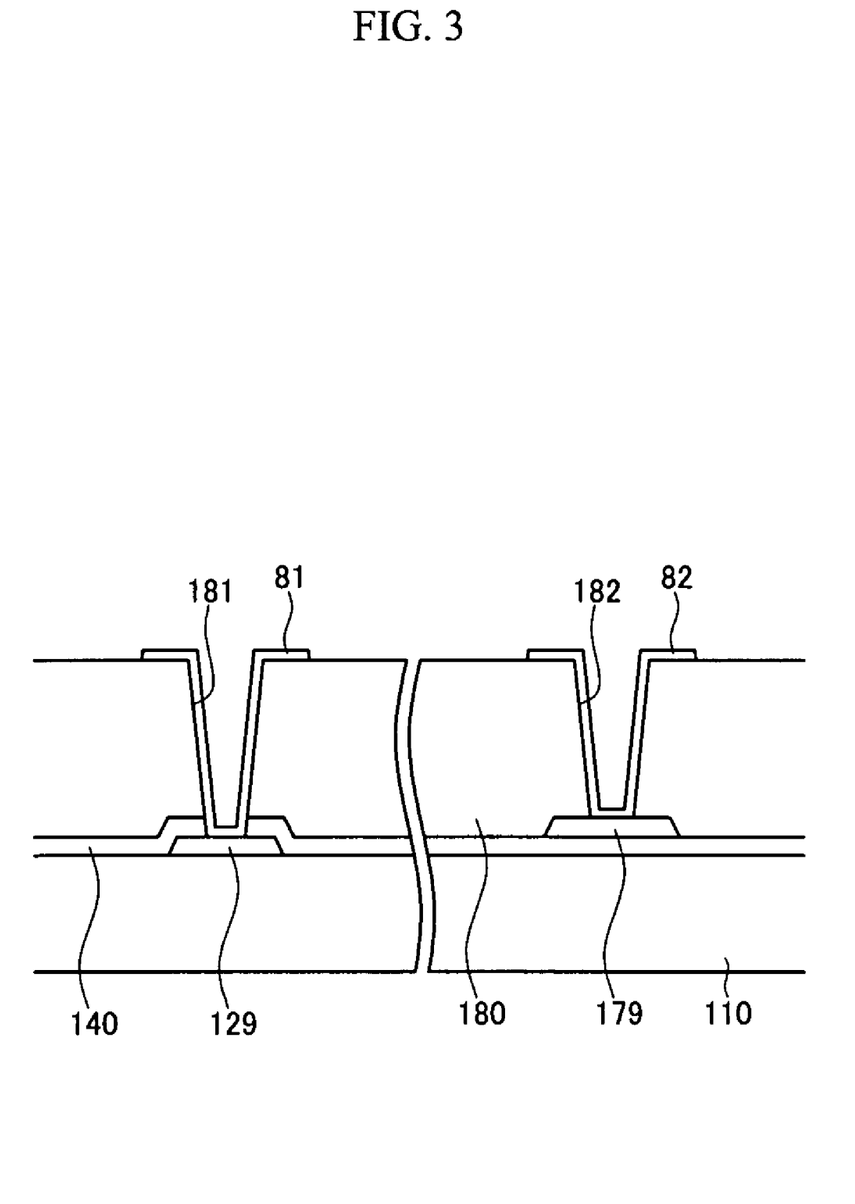

FIG. 1 is a layout view of a thin film transistor array panel according to an exemplary embodiment of the present invention, and FIG. 2 and FIG. 3 are cross-sectional views of the thin film transistor array panel taken along lines II-II and III-III of FIG. 1, respectively.

The liquid crystal display according to the present exemplary embodiment includes a thin film transistor array panel 100 and a common electrode panel 200 that face each other, and a liquid crystal layer 3 interposed between the two display panels 100 and 200.

The thin film transistor array panel 100 of the liquid crystal display will now be described in detail with reference to FIG. 1 to FIG. 3.

A plurality of gate lines 121 are formed on an insulation substrate 110 made of transparent glass or plastic.

The gate lines 121 include a plurality of gate electrodes 124 that are protruded upward and wide ends 129 for connecting with another layer or external driving circuits. A gate driving circuit (not shown) for generating a gate signal may be mounted on a flexible printed circuit film (not shown) attached on the substrate 110, mounted directly on the substrate 110, or integrated with the substrate 110. If the gate driving circuit is integrated with the substrate 110, it may be directly connected to the gate lines 121.

The gate lines 121 are made of an aluminum (Al) group metal including Al or an Al alloy, a silver (Ag) group metal including Ag or a Ag alloy, a copper (Cu) group metal including Cu or a Cu alloy, a molybdenum (Mo) group metal including Mo or a Mo alloy, chromium (Cr), tantalum (Ta), or titanium (Ti). However, the gate lines 121 may have a multi-layered structure including two conductive layers (not shown) that have different physical properties each other. One of the two conductive layers is made of a low-resistive metal to reduce voltage drop, such as an Al group metal, an Ag group metal, and a Cu group metal. The other conductive layer is made of a material that has excellent physical, chemical, and electrical contact characteristics with other materials, particularly, with indium tin oxide (ITO) and indium zinc oxide (IZO), for example, a Mo group metal, chromium, tantalum, and titanium. An exemplary combination may be the combination of a chromium lower layer and an aluminum (alloy) upper layer, and the combination of an aluminum (alloy) lower layer and a molybdenum (alloy) upper layer. The gate lines 121, however, may be made of other various metals or conductors.

The sides of the gate lines 121 are inclined to the surface of the substrate 110, and it is preferable that the inclination angle be about 30 to 80 degrees.

A gate insulating layer 140 that is made of silicon nitride (SiNx) or silicon oxide (SiOx) is formed on the gate lines 121.

A plurality of semiconductor islands 152 and 154 that are made of hydrogenated amorphous silicon (a-Si) or polysilicon are formed on the gate insulating layer 140. The semiconductors 154 are placed on the gate electrodes 124, and the semiconductors 152 cover the boundaries of the gate lines 121 to prevent the disconnection of the gate lines 121.

A plurality of ohmic contact islands 163 and 165 are formed on the semiconductors 154. The ohmic contacts 163 and 165 may be made of silicide or n+ hydrogenated amorphous silicon in which an n-type impurity such as phosphorus is highly doped. The ohmic contacts 163 and 165 form pairs to be disposed on the semiconductors 154. An additional ohmic contact island 162 is provided on the semiconductors 152.

The sides of the semiconductors 152 and 154 and the ohmic contacts 162, 163, and 165 are also inclined to the surface of the substrate 110 at about 30 to 80 degrees.

A plurality of data lines 171 and a plurality of drain electrodes 175 are formed on the ohmic contacts 162, 163, and 165 and the gate insulating layer 140.

The data lines 171 transfer data signals and extend mainly in a vertical direction to cross the gate lines 121. The data lines 171 have a plurality of U-shaped source electrodes 173 extending toward the gate electrodes 124 and wide ends 179 for connecting with another layer or external driving circuits. A data driving circuit (not shown) for generating the data signals may be mounted on a flexible printed circuit film (not shown) attached on the substrate 110, mounted directly on the substrate 110, or integrated with the substrate 110. If the data driving circuit is integrated with the substrate 110, it may be directly connected to the data lines 171.

The drain electrodes 175 are separated from the data lines 171 and face the source electrodes 173 with the gate electrodes 124 interposed therebetween. Each of the drain electrodes 175 has one wide end and one rod-shaped end. The wide end is connected to a pixel electrode 191 through a contact hole 185, and the rod-shaped end is partially surrounded by a source electrode 173.

A thin film transistor (TFT) consists of one gate electrode 124, one source electrode 173, and one drain electrode 175 together with the semiconductor 154, and the channel of the TFT is formed on the semiconductor 154 between the source electrode 173 and the drain electrode 175.

It is preferable that the data lines 171 and the drain electrodes 175 be made of a refractory metal such as molybdenum, chromium, tantalum, titanium, and alloys thereof, and have a multi-layered structure having a refractory metal layer (not shown) and a low-resistance conductive layer (not shown). An exemplary multi-layered structure may be a double-layered structure of a chromium or molybdenum (alloy) lower layer and an aluminum (alloy) upper layer, or a triple-layered structure of a molybdenum (alloy) lower layer, an aluminum (alloy) middle layer, and a molybdenum (alloy) upper layer. The data lines 171 and drain electrodes 175, however, may be made of other various metals or conductors.

The sides of the data lines 171 and the drain electrodes 175 are inclined to the surface of the substrate 110, and it is preferable that the inclination angle be about 30 to 80 degrees.

The ohmic contacts 162, 163, and 165 are disposed only between the semiconductors 152 and 154, and the data lines 171 and drain electrodes 175 to reduce the contact resistance between them.

A passivation layer 180 that is made of an inorganic material such as silicon nitride or silicon oxide is formed on the data lines 171 and drain electrodes 175, and exposed regions of the semiconductors 154. The passivation layer 180 may be made of an organic material and may have a double-layered structure composed of a lower inorganic layer and an upper organic layer to protect the exposed regions of the semiconductors 152 and 154 and to provide excellent insulating characteristics of the layers.

A plurality of contact holes 182 and 185 are formed on the passivation layer 180 to expose ends 179 of the data lines 171 and the drain electrodes 175, respectively. Also, a plurality of contact holes 181 are formed on the passivation layer 180 and the gate insulating layer 140 to expose ends 129 of the gate lines 121.

A plurality of pixel electrodes 191 and a plurality of contact assistants 81 and 82 are formed on the passivation layer 180. They may be made of a transparent conductive material such as ITO or IZO.

An interlayer insulating layer 187 is formed on the pixel electrodes 191 and the passivation layer 180, and it may be made of a transparent inorganic insulator including silicon nitride or silicon oxide. The interlayer insulating layer 187 may be removed at the ends 129 of the gate lines 121 or the ends 179 of the data lines 171 to connect such to an external device.

Light blocking members 220 that are made of a conductive material are formed on the interlayer insulating layer 187. The light blocking members 220 are also called a black matrix. The light blocking members 220 may consist of one portion corresponding to the pixel electrodes 191, the gate lines 121, and the data lines 171, and another portion corresponding to the thin film transistors, and they are overlapped with the boundaries of the pixel electrodes 191, the gate lines 121, and the data lines 171. The light blocking members 220 prevent light leakage from between the pixel electrodes 191 and receive a storage voltage from the outside.

The pixel electrodes 191 are physically and electrically connected to the drain electrodes 175 through the contact holes 185 and receive data voltages from the drain electrodes 175. The pixel electrode 191 on which a data voltage is applied generates an electric fields together with a common electrode 270 of the common electrode panel 200 on which a common voltage is applied, so as to determine the orientation of the liquid crystal molecules in the liquid crystal layer 3 between the two electrodes. The polarization of light that passes through the liquid crystal layer varies depending on the orientation of the liquid crystal molecules. The pixel electrodes 191 and common electrode 270 form capacitors (hereinafter, referred to as liquid crystal capacitors) that maintain some of the applied voltage even after the thin film transistors are turned off.

The pixel electrodes 191 are overlapped by the light blocking members 220 to receive a storage voltage from the outside to form the capacitors. The capacitors formed by overlapping the pixel electrodes 191 and the light blocking members 220 are called storage capacitors, and the storage capacitors enhance the voltage maintaining ability of the liquid crystal capacitors.

The common electrode panel 200 will now be described with reference to FIG. 2 and FIG. 3.

The common electrode 270 is formed on an insulation substrate 210 made of transparent glass or plastic, and the common electrode 270 is made of a transparent conductor such as ITO or IZO.

Alignment layers (not shown) are applied on the inner surfaces of the display panels 100 and 200, and they may be a horizontal alignment layer or a vertical alignment layer. Polarizers (not shown) are provided on the outer surfaces of the display panels 100 and 200. The polarization axes of the two polarizers are perpendicular to each other, and it is desirable that one of the two polarization axes runs parallel to the gate lines 121. In the case of a reflective liquid crystal display, one of the two polarizers may be omitted.

The liquid crystal display according to the present exemplary embodiment may further include a phase retardation film (not shown) for compensating for the delay of the liquid crystal layer.

In addition, the liquid crystal display according to an exemplary embodiment of the present invention may further include a backlight unit 900 for providing the polarizers, phase retardation film, display panels 100 and 200, and liquid crystal layer 3 with light. The backlight unit 900 of the liquid crystal display according to an exemplary embodiment of the present invention is made of light emitting diodes (LEDs) or the like, and includes a plurality of light sources for representing primary colors. The example of the primary colors may be three primary colors, red, green, and blue. The light sources for red, green, and blue colors are sequentially switched off, and each pixel alternatively represents the primary colors with time, recognizing a desired color by the spatial and temporal sum of these primary colors.

In the case of a liquid crystal display in which color filters are formed on the common electrode panel 200 corresponding to the thin film transistor array panel 100, light blocking members are generally formed on the common electrode panel 200. However, when the light blocking members are formed on the common electrode panel 200 opposite to the thin film transistor array panel 100, an alignment error may occur in assembling the two display panels 100 and 200, and may cause the contrast ratio of the liquid crystal display to reduce because light is not blocked at the portions that the pixel electrodes cannot control.

Also, a storage capacitor of a liquid crystal display is generally formed by overlapping the drain electrode 175 that is electrically connected to the pixel electrode 191 with a storage electrode that is formed on the substrate with the gate insulating layer 140 interposed therebetween.

On the contrary, in the liquid crystal display according to the present exemplary embodiment, three primary colors are represented by using the backlight unit, not color filters. The light blocking members 220 are formed on the thin film transistor array panel 100, preventing the deterioration of color reproducibility and the reduction of screen contrast ratio caused by an alignment error between the two display panels 100 and 200. Also, the storage capacitor of the liquid crystal display according to the present exemplary embodiment is formed by overlapping the pixel electrodes 191 and the light blocking members 220 that receive a storage voltage, with the interlayer insulating layer 187 interposed therebetween.

That is, the light blocking members 220 made of a conductive material are formed on the thin film transistor array panel 100, and function as not only a light blocking member but also as a storage electrode, increasing the aperture ratio of the liquid crystal display compared with a liquid crystal display including a storage electrode formed on the thin film transistor array panel.

A liquid crystal display according to another exemplary embodiment of the present invention will now be described in detail with reference to FIG. 4 to FIG. 6.

Figure 4:
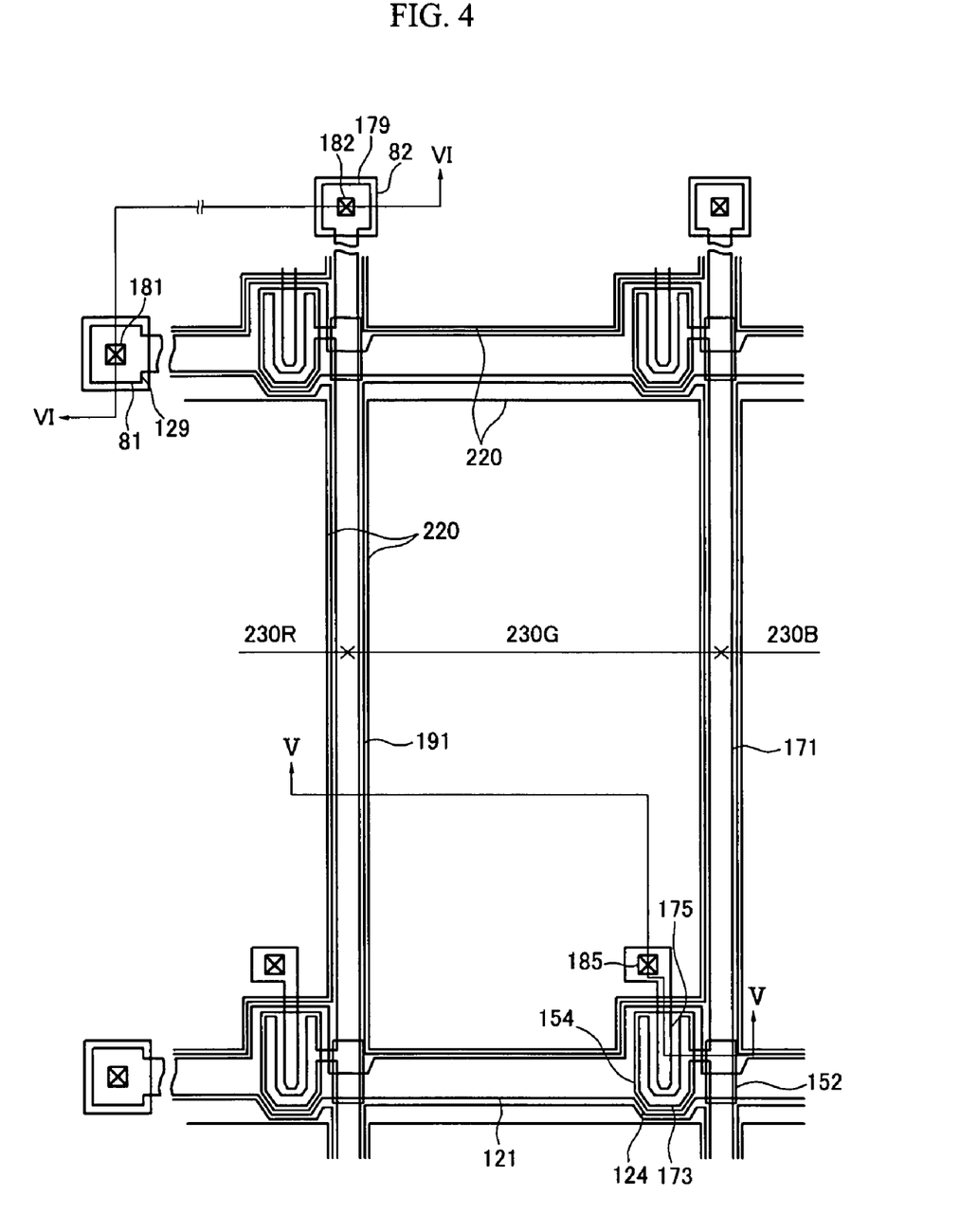
FIG. 4 is a layout view of a liquid crystal display according to another exemplary embodiment of the present invention.
Figure 5:
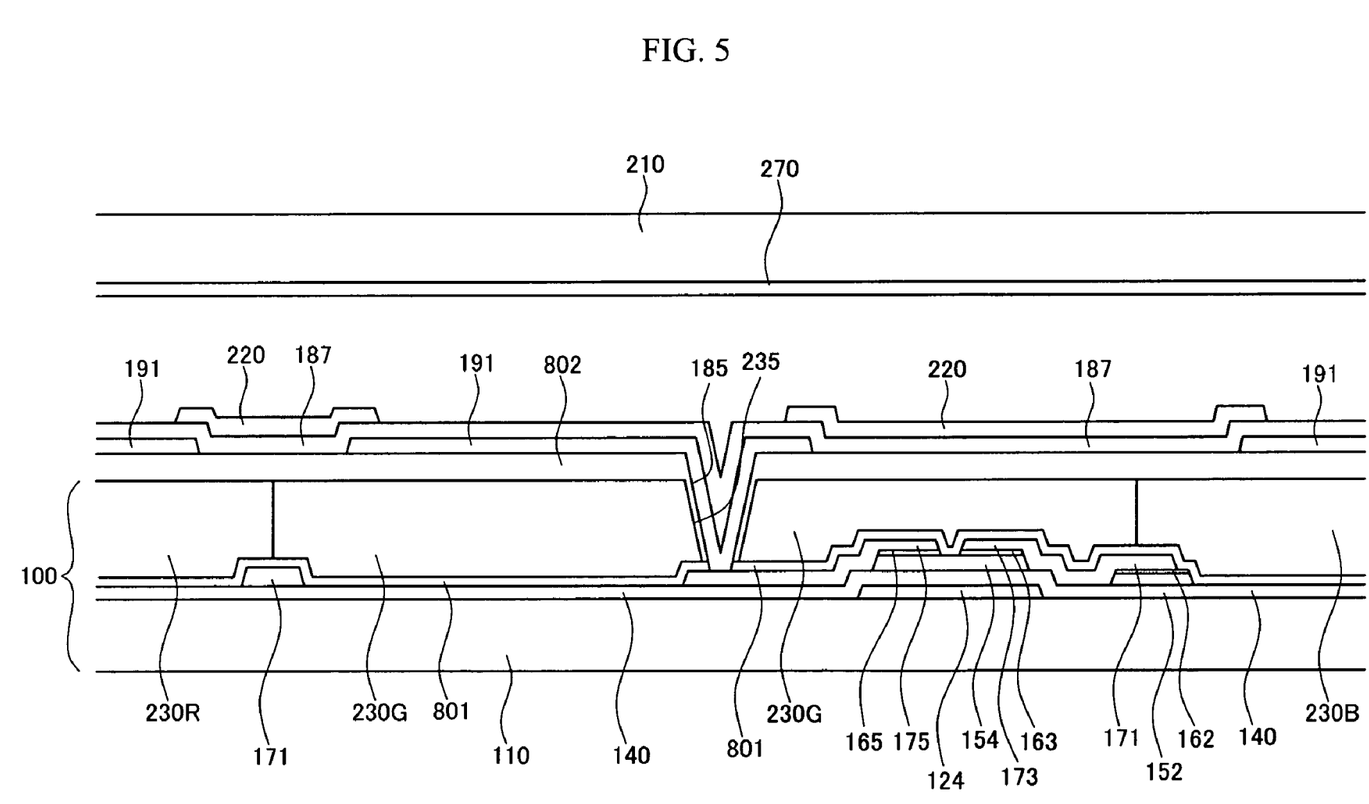
FIG. 5 and FIG. 6 are cross-sectional views of the liquid crystal display taken along the lines V-V and VI-VI of FIG. 4, respectively.
Figure 6:
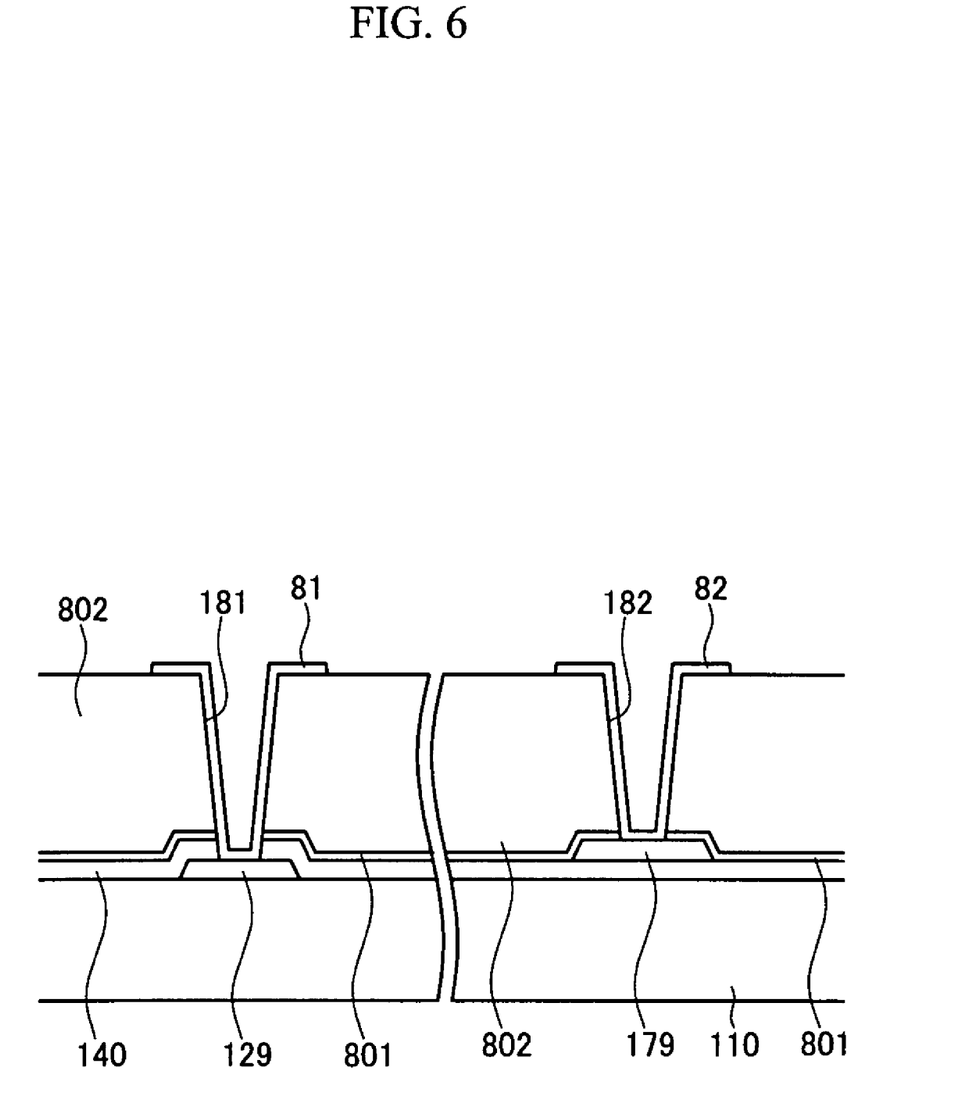

FIG. 4 is a layout view of the liquid crystal display according to another exemplary embodiment of the present invention, and FIG. 5 and FIG. 6 are cross-sectional views of the liquid crystal display taken along the lines V-V and VI-VI of FIG. 4, respectively.

The liquid crystal display according the present exemplary embodiment also includes a thin film transistor array panel 100 and a common electrode panel 200 that face each other, and a liquid crystal layer 3 interposed between the two display panels 100 and 200.

In the thin film transistor array panel 100, a plurality of gate lines 121 including gate electrodes 124 are formed on a substrate 110. A gate insulating layer 140, a plurality of semiconductor islands 152 and 154, and a plurality of ohmic contact islands 162, 163, and 165 are sequentially formed on the gate lines 121. A plurality of data lines 171, including source electrodes 173 and ends 179, and a plurality of drain electrodes 175 are formed on the ohmic contacts 162, 163, and 165.

A first protection layer 801 is formed on the gate insulating layer 140, the data lines 171, and the drain electrodes 175. The first protection layer 801 prevents pigments of color filters 230R, 230G, and 230B that will be formed later from flowing into the semiconductor layer 154.

The color filters 230R, 230G, and 230B are formed on the first protection layer 801. The color filters 230R, 230G, and 230B extend longitudinally to run parallel to the data lines 171 along pixel columns divided by the data lines 171, and are alternatively formed along with the pixel columns. The color filters 230R, 230G, and 230B are removed at regions in which contact holes will be formed to expose ends 129 of the gate lines 121 or ends 179 of the data lines 171 connected to external circuits. Also, they are removed at regions 235 in which contact holes will be formed to expose the drain electrodes 175.

A second protection layer 802 is provided on the color filters 230R, 230G, and 230B, and it prevents the pigments of the color filters from flowing into the liquid crystal layer 3.

Herein, the second protection layer 802 may be omitted.

Contact holes 181, 182, and 185 are formed on the first and second protection layers 801 and 802 to expose the ends 129 of the gate lines, the ends 179 of the data lines 171, and the drain electrodes 175, respectively.

A plurality of pixel electrodes 191 made of ITO or IZO and a plurality of contact assistants 81 and 82 are formed on the second protection layer 802.

An interlayer insulating layer 187 that is made of a transparent inorganic insulator including silicon nitride or silicon oxide is formed on the pixel electrodes 191 and the second protection layer 802, and it may be removed at ends 129 of the gate lines 121 or ends 179 of the data lines 171 that are connected to external circuits.

Light blocking members 220 made of a conductive material are formed on the interlayer insulating layer 187. The light blocking members 220 prevent light leakage from between the pixel electrodes 191, and overlap the pixel electrodes 191 to form storage capacitors.

The pixel electrodes 191 are physically and electrically connected to the drain electrodes 175 through contact holes 185 and receive a data voltage from the drain electrodes 175. The pixel electrode 191 on which a data voltage is applied generates an electric field together with a common electrode 270 of the display panel 200 on which a common voltage is applied, so as to determine the orientation of the liquid crystal molecules in the liquid crystal layer 3 between the two electrodes. The polarized light that passes through the liquid crystal layer varies depending on the orientation of the liquid crystal molecules determined by the applied electric field. The pixel electrodes 191 and the common electrode 270 form capacitors (hereinafter, referred to as liquid crystal capacitors) to maintain the applied voltage even after the thin film transistors are turned off.

The pixel electrodes 191 are overlapped by the light blocking members 220 that receive a storage voltage from the outside to form capacitors. The capacitors formed by overlapping the pixel electrodes 191 and the light blocking members 220 are called storage capacitors, and the storage capacitors enhance the voltage maintaining ability of the liquid crystal capacitors.

A common electrode panel 200 will now be explained. In the common electrode panel 200, a common electrode 270 that is made of a transparent conductor is formed on an insulation substrate 210 that is made of transparent glass or plastic.

In the liquid crystal display according to the present exemplary embodiment, the color filters 230R, 230G, and 230B and the light blocking members 220 made of a conductive material are formed on the thin film transistor array panel 100, preventing the deterioration of color reproducibility and the reduction of the screen contrast ratio caused by an alignment error between the two display panels 100 and 200.

Also, the liquid crystal display according to the present exemplary embodiment includes the storage capacitors that are formed by overlapping the pixel electrodes 191 that receive data signals with the light blocking members 220 that receive a storage voltage with the gate insulating layer 140 interposed therebetween. Therefore, the light blocking members 220 function as not only a light blocking member but also as a storage electrode, increasing the aperture ratio of the liquid crystal display compared with a liquid crystal display including additional storage electrodes.

A liquid crystal display according to a further exemplary embodiment of the present invention will now be described in detail with reference to FIG. 7 to FIG. 9.

Figure 7:
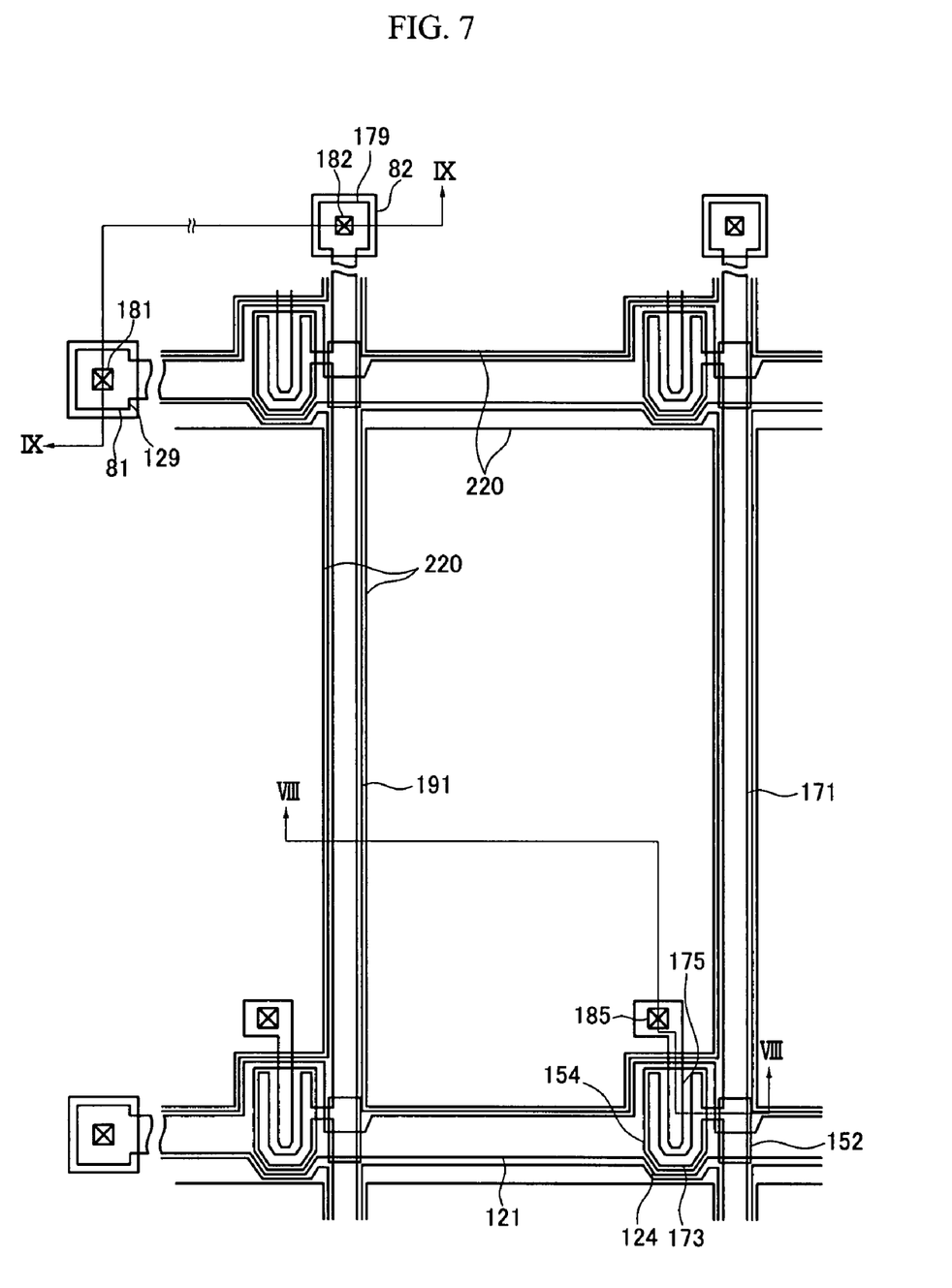
FIG. 7 is a layout view of a liquid crystal display according to a further exemplary embodiment of the present invention.
Figure 8:
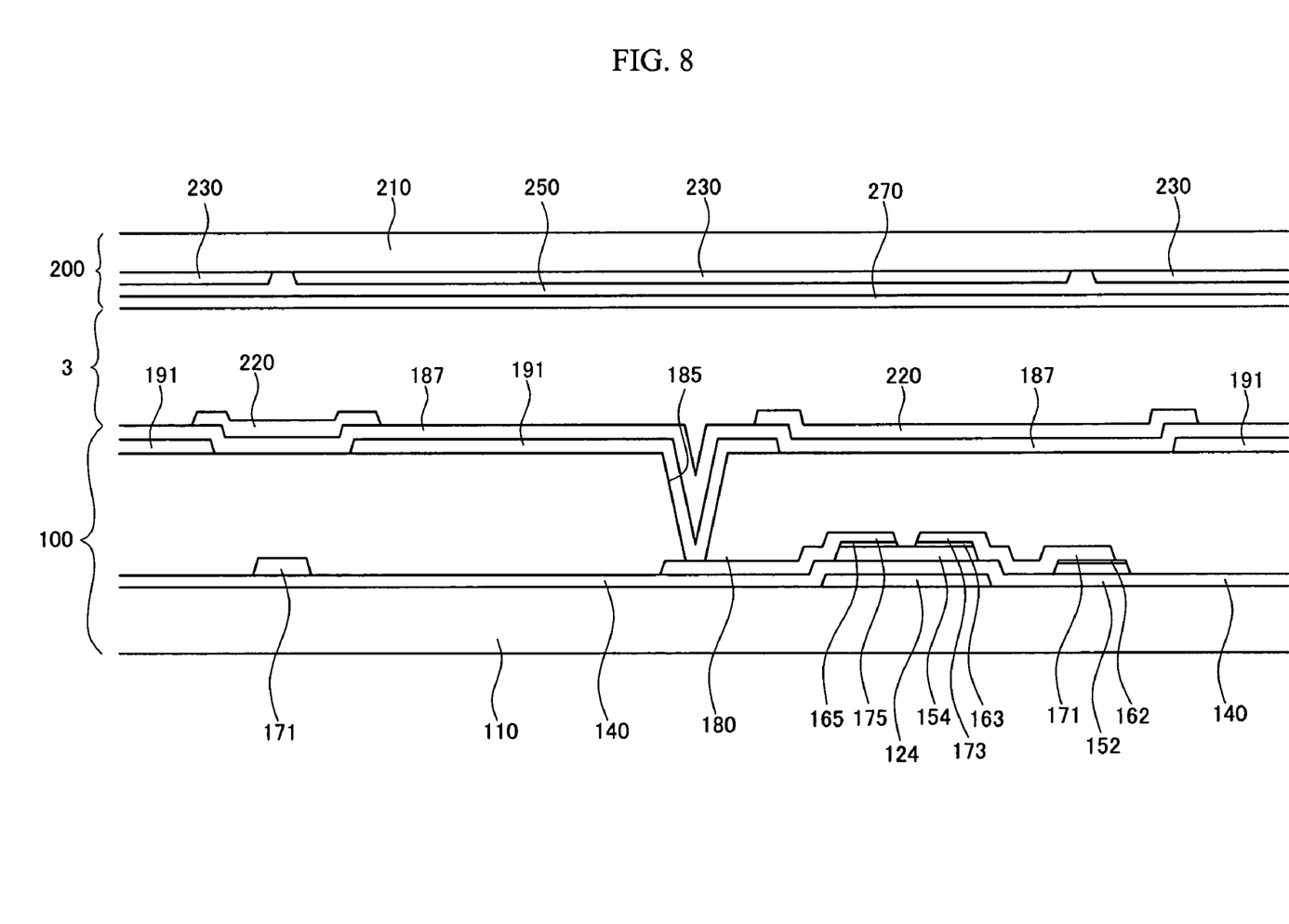
FIG. 8 and FIG. 9 are cross-sectional views of the liquid crystal display taken along the lines VIII-VIII and IX-IX of FIG. 7, respectively.
Figure 9:
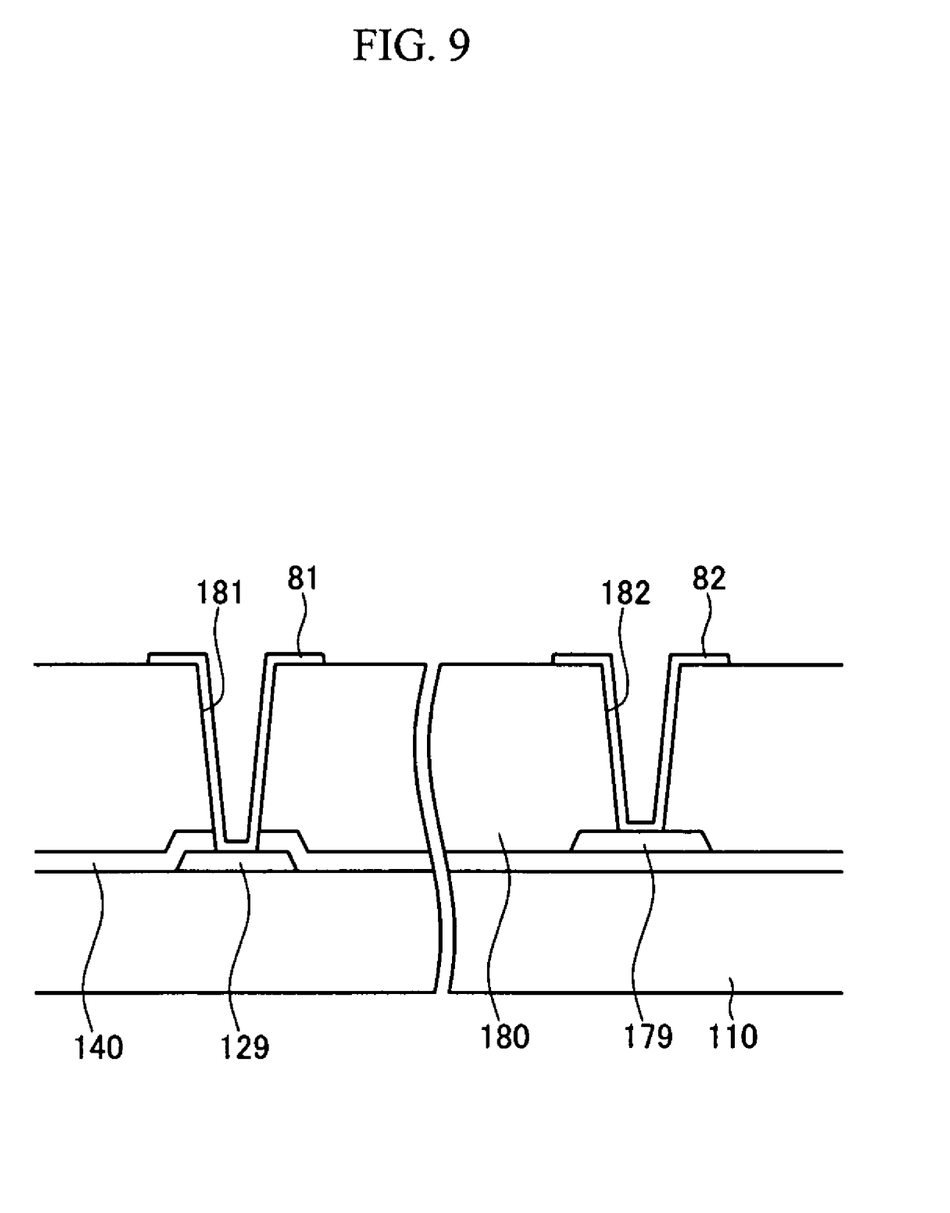

FIG. 7 is a layout view of the liquid crystal display according to a further exemplary embodiment of the present invention, and FIG. 8 and FIG. 9 are cross-sectional views of the liquid crystal display taken along the lines VIII-VIII and IX-IX of FIG. 7, respectively.

The liquid crystal display according to the present exemplary embodiment also includes a thin film transistor array panel 100 and a common electrode panel 200 that face each other, and a liquid crystal layer 3 interposed between the two display panels 100 and 200.

In the thin film transistor array panel 100, a plurality of gate lines 121 including gate electrodes 124 are formed on a substrate 110.

A gate insulating layer 140, a plurality of semiconductor islands 152 and 154, and a plurality of ohmic contact islands 162, 163, and 165 are sequentially formed on the gate lines 121.

A plurality of data lines 171, each including source electrodes 173 10 and an end 179, and a plurality of drain electrodes 175 are formed on the ohmic contacts 162, 163, and 165.

A passivation layer 180 is formed on the gate insulating layer 140, the data lines 171, and the drain electrodes 175. The passivation layer 180 may have an excellent planarization characteristic and photosensitivity, and its dielectric constant is preferably less than about 4.0. The passivation layer 180 may be made of an inorganic material and have a double-layered structure composed of a lower inorganic layer and an upper organic layer to protect the exposed regions of the semiconductors 152 and 154 and to provide the excellent insulating characteristics of the layers.

An interlayer insulating layer 187 is formed on the pixel electrodes 191 and the passivation layer 180, and it may be made of a transparent inorganic insulator including silicon nitride or silicon oxide. The interlayer insulating layer 187 may be removed at ends 129 of the gate lines 121 or ends 179 of the data lines 171 to connect such to external circuits.

Light blocking members 220 that are made of a conductive material are formed on the interlayer insulating layer 187. The light blocking members 220 prevent light leakage from between the pixel electrodes 191 and are overlapped with the pixel electrodes 191 to form storage capacitors.

The pixel electrodes 191 are physically and electrically connected to the drain electrodes 175 through contact holes 185 and receive a data voltage from the drain electrodes 175. The pixel electrode 191 on which a data voltage is applied generates an electric field together with a common electrode 270 of the other display panel 200 on which a common voltage is applied, so as to determine the orientation of liquid crystal molecules of the liquid crystal layer 3 between the two electrodes. The polarization of light that passes through the liquid crystal layer varies depending on the determined orientation of the liquid crystal molecules.

The pixel electrodes 191 are overlapped with the light blocking members 220 that receive the storage voltage from the outside to form capacitors. The capacitors formed by overlapping the pixel electrodes 191 and the light blocking members 220 are called storage capacitors, and the storage capacitors enhance the voltage maintaining ability of the liquid crystal capacitors.

The common electrode panel 200 will now be explained. In the common electrode panel 200, a plurality of color filters 230 are formed on an insulation substrate 210 that is made of transparent glass or plastic. The color filters may extend in a vertical direction along the columns of pixel electrodes 191. Each of the color filters 230 may represent one of three primary colors, red, green, and blue.

An overcoat 250 is formed on the color filters 230. The overcoat 250 may be made of an (organic) insulator and prevents the color filters from being exposed to provide a flat surface. The overcoat 250 may be omitted.

The common electrode 270 is formed on the overcoat 250. The common electrode 270 is made of a transparent conductor such as ITO or IZO.

The liquid crystal display according to the present exemplary embodiment includes the light blocking members 220 that are formed on the thin film transistor array panel 100, thereby preventing the reduction of the screen contrast ratio by an alignment error of the two display panels 100 and 200. Also, the liquid crystal display includes the storage capacitors that are formed by overlapping the pixel electrodes 191 that receive a data signal with the light blocking members that receive a storage voltage with the interlayer insulating layer 187 interposed therebetween, thereby increasing the aperture ratio of the liquid crystal display.

In the liquid crystal display according to the present invention, the color filters and the light blocking members 220 made of a conductive material are formed on the thin film transistor array panel, thereby preventing the deterioration of the color reproducibility and the reduction of the screen contrast ratio by an alignment error of the two display panels. Also, the storage capacitors are formed by overlapping the pixel electrodes with the light blocking members, thereby increasing the aperture ratio of the liquid crystal display compared with a liquid crystal display including additional storage electrodes.

In the liquid crystal display according to the present invention, three primary colors are represented by using the backlight unit, rather than color filters, and the light blocking members are simultaneously formed on the thin film transistor array panel, thereby preventing the deterioration of the color reproducibility and the reduction of the screen contrast ratio by an alignment error of the two display panels 100. Also, the storage electrodes are formed by overlapping the pixel electrodes with the light blocking members that receive a storage voltage, increasing the aperture ratio of the liquid crystal display.

As described above, the liquid crystal display according to the present invention can prevent the deterioration of the color reproducibility and the reduction of the screen contrast ratio by an alignment error of the two display panels, and can increase the aperture ratio of the liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a thin film transistor;
   a color filter formed on the first substrate and the thin film transistor;
   a first electrode formed on the color filter;
   an interlayer insulating layer formed on the first electrode;
   a light blocking member formed on the interlayer insulating layer and partially overlapping the first electrode;
   a second substrate facing the first substrate;
   a second electrode formed on the second substrate; and
   a liquid crystal layer interposed between the first and second substrates,
   wherein the light blocking member and the first electrode overlap each other with the interlayer insulating layer interposed therebetween to form a storage capacitor.

2. The liquid crystal display of claim 1,
   wherein the thin film transistor comprises:
   a gate electrode formed on the first substrate;
   a gate insulating layer formed on the first substrate;
   a semiconductor layer formed on the gate insulating layer;
   a source electrode and a drain electrode formed on the gate insulating layer and the semiconductor layer; and
   further comprising:
   a passivation layer formed on the data line and the drain electrode.

3. The liquid crystal display of claim 1, wherein the light blocking member includes a conductive material.

4. The liquid crystal display of claim 3, wherein a storage voltage is applied to the light blocking member.

* * * * *